(12) United States Patent
Cheng et al.

(10) Patent No.: US 9,860,744 B1
(45) Date of Patent: Jan. 2, 2018

(54) ELECTRONIC CONTENT REQUESTS

(71) Applicant: Apple Inc., Cupertino, CA (US)

(72) Inventors: Julie W. Cheng, San Jose, CA (US);
Kuriakose Sony Theakanath, San Jose, CA (US); Michael R. Siracusa, Mountain View, CA (US); Ryan S. Mehlmauer, San Jose, CA (US); Sagar A. Joshi, San Jose, CA (US); Subash Sundaresan, San Jose, CA (US); Todd M. Teresi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/290,914

(22) Filed: Oct. 11, 2016

Related U.S. Application Data

(60) Provisional application No. 62/360,835, filed on Jul. 11, 2016.

(51) Int. Cl.
*H04M 3/16* (2006.01)
*H04W 12/02* (2009.01)
*H04L 29/08* (2006.01)
*H04M 1/725* (2006.01)
*H04W 88/02* (2009.01)

(52) U.S. Cl.
CPC ............. *H04W 12/02* (2013.01); *H04L 67/22* (2013.01); *H04M 1/72583* (2013.01); *H04W 88/02* (2013.01)

(58) Field of Classification Search
CPC ....................................................... H04W 12/02
USPC ........................................................... 455/411
See application file for complete search history.

(56) References Cited

U.S. PATENT DOCUMENTS

2011/0117890 A1* 5/2011 Lundgren ......... H04M 1/72525
455/414.1

* cited by examiner

*Primary Examiner* — Joel Ajayi
(74) *Attorney, Agent, or Firm* — Kilpatrick Townsend & Stockton LLP

(57) ABSTRACT

Systems, methods, and computer-readable medium are provided for managing electronic content requests. For example, a user device may collect usage information associated with use of the user device. The user device may transmit data corresponding to a first category of usage information to a service provider. In some examples, a file that comprises a plurality of electronic content items can be received. The file may also contain logic for determining which of the content items to display. The logic may be executed to determine a particular item of the content items to display based at least in part on additional data corresponding to a second category of the usage information. In some examples, the user device may prepare the particular content item for display.

18 Claims, 7 Drawing Sheets

ELECTRONIC CONTENT REQUESTS

CROSS-REFERENCES TO RELATED APPLICATIONS

This application claims the benefit of U.S. Provisional Application No. 62/360,835, filed Jul. 11, 2016, the disclosure of which is incorporated herein by reference.

BACKGROUND

Electronic content to be presented to a particular user is often tailored for that specific user based on personal and/or user-specific information. However, privacy concerns have made users less willing to allow their activities to be tracked by their devices and/or service providers that manage the use of their devices. However, in some instances, the usage information is permitted to be collected, usually to enable enhanced functionality of the device (e.g., tracking health and/or exercise statistics). Still, users are reluctant to allow this personal usage information to be shared outside of the device that implements the data collection. Additionally, with the number of network-connected devices ever increasing, bandwidth and network traffic issues have become an issue for most users. Thus, providing relevant electronic content has become increasingly challenging.

SUMMARY

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, a computer-implemented implemented on a client device is provided. The method may comprise collecting usage information corresponding to use of the client device by a user, the usage information comprising a first category of the usage information and a second category of the usage information. Additionally, in some examples, the method may comprise identifying that the first category of the usage information can be transmitted to other computing devices over a wireless computing network and/or transmitting, utilizing the wireless computing network, first data corresponding to the first category of the usage information to a server computer. In some cases, the method may also comprise receiving, utilizing the wireless computing network, a plurality of electronic content items configured to be rendered on a screen of the client device, the plurality of electronic content items comprising logic for determining which of the plurality of electronic content items to display. Further, in some examples, the method may also comprise accessing second data corresponding to the second category of the usage information, executing the logic to determine a particular electronic content item of the plurality of electronic content items to display based at least in part on the second data, and/or preparing the particular electronic content item for display on the screen of the client device.

Additionally, the logic may comprise if-then-else instructions configured to be evaluated utilizing the second data and/or exectuing the logic may comprise evaluating one if-then-else clause of the if-then-else instructions for each electronic content item of the plurality of electronic content items. In some examples, at least one of the plurality of electronic content items may be configured to be customized based at least in part on the second data. Further, in some cases, the second category of the usage information may comprise user information corresponding to the user.

In some examples, a user device may be provided. The user device may comprise a memory configured to store computer-executable instructions, a display device, and a processor configured to access the memory and the display device, and to execute the computer-executable instructions. When executed, the instructions may implement an application of the user device, identify a request, from the application, for electronic content to be displayed on the display device, and/or provide the request to a server computer, the request comprising information of a first type that identifies usage of the device by a user. Additionally, in some examples, the instructions may also receive a file comprising a plurality of electronic content items, determine a particular electronic content item of the plurality of electronic content items based at least in part on user information of a second type that identifies other usage of the device by the user, and/or prepare the particular electronic content item for presentation on the display device.

Additionally, the file may further comprise instructions for selecting the particular electronic content item of the plurality of electronic content items, the particular electronic content item may be determined by executing the instructions, and/or the instructions may comprise if-then logic for evaluating at least one if-then clause of the if-then logic for each electronic content item of the plurality of electronic content items. In some cases, the file may be generated by the server computer based at least in part on the information of the first type, the information of the first type may comprise usage information that is identified as shareable with the server computer, and/or the user information of the second type comprises usage information that is identified as exclusive to the memory of the user device. In some instances, at least one electronic content item of the plurality of electronic content items may be configurable based at least in part on the user information of the second type, a portion of the at least one electronic content item that is configurable may be determined to be configurable by a service provider configured to provide the at least on electronic content item to the server computer, and/or the portion of the at least one electronic content item may be revised with additional data received from a service provider based at least in part on a request from the user device. In some examples, the user information of the second type may be accessible via an application programming interface method call made to a local data storage service of the user device and/or at least one electronic content item of the plurality of electronic content items may comprise an expiration date.

Additionally, a computer-readable storage medium may be provided. In some instances, instructions stored on the storage medium, when executed by a processor of a user device, cause the processor to perform operations comprising transmitting first data corresponding to a first category of usage information to a service provider, receiving a file that comprises a plurality of electronic content items configured to be rendered on a screen of the user device and that comprises logic for determining which of the plurality of electronic content items to display, executing the logic to determine a particular electronic content item of the plurality of electronic content items to display based at least in part on second data corresponding to a second category of the usage information, and/or preparing the particular electronic content item for display. In some examples, the logic, when executed, may configure the user device to determine the particular electronic content item of the plurality of content items to display based at least in part on a level of usage of an application of the user device. Further, in some embodiments, the second data may only be accessible by first-party applications of the user device.

The following detailed description together with the accompanying drawings will provide a better understanding of the nature and advantages of the present disclosure.

DETAILED DESCRIPTION

Figure 1:
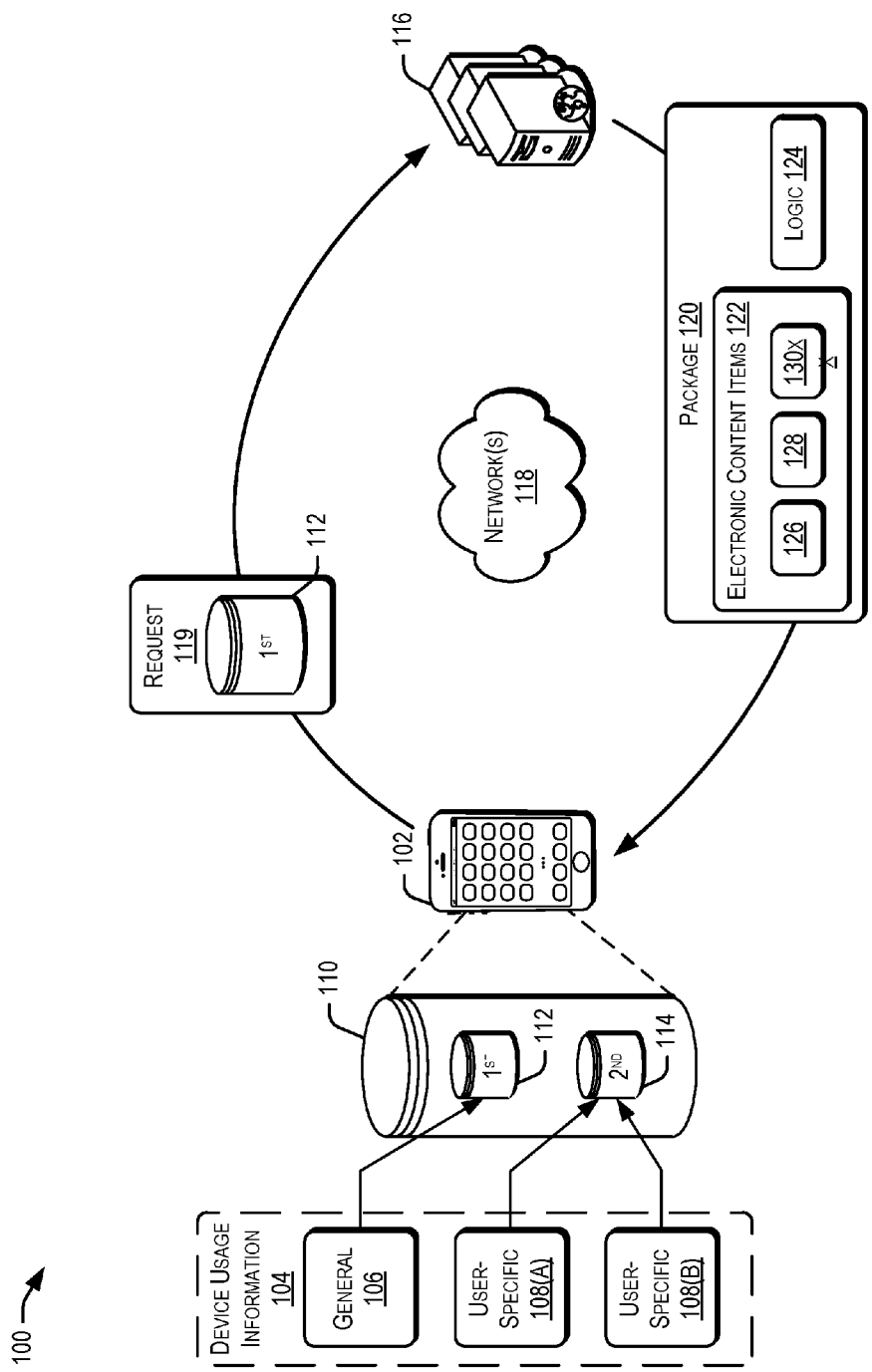
FIG. 1 is a simplified block diagram illustrating at least some example techniques for managing electronic content requests as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, providing personalized electronic content to users without disclosing or otherwise sharing the personal information of those users. In particular, a user device (e.g., mobile device) may collect usage information and/or other personal information associated with the user. For example, the user device (or a management service or module implemented on the user device) may collect information that identifies how often the user interacts with the device, what actions the user takes with the device, which applications are ordered, downloaded, and/or utilized by the user, etc. However, in some examples, the user may request or require that this usage information not be shared outside of the user device or with other applications of the user device. Alternatively, or in addition, the user device may be instructed to not share certain user and/or usage information based at least in part on a set of rules defined by the user or another entity (e.g., from a privacy team associated with the developer of the user device).

In some cases, a server computer (e.g., a web server, an advertisement server, etc.) may be configured to provide electronic content to the user device for eventual (or automatic) presentation to the user. In some examples, the electronic content may be an advertisement (e.g., an advertising message, image, audio clip, and/or video clip) that can be presented on a display device (e.g., a screen) and/or played using an audio output device (e.g., one or more speakers). In some examples, the server computer may also be configured to receive advertisement requests (e.g., from an application of the user device), and transmit one or more advertisements back to the user device at least response to the request. In most cases, some amount of information would be received with the request (from the user device) so that the server computer is able to determine an appropriate advertisement for the particular situation, user, user device, etc. Without such information, the advertisement that is provided by the server may not be relevant to the user.

In some examples, the user device may determine a subset of the user/usage information to be provided with a content request. For example, the subset may include non-private and/or non-sensitive user and/or usage information. Examples of non-private information that may be provided include, but are not limited to, a type of the user device (e.g., mobile phone, tablet, etc.), a time of day, and/or any information that does not identify the user or personal information about the user. Examples of non-sensitive information that may be provided include, but are not limited to, a username or name of the user, a location of the user, and/or other information that might identify the user but that is not of a sensitive nature. As indicated, user and/or usage information that would not be provided to the content server with the request may be indicated by one or more rules that are received from a developer and/or the user. Examples of information that is generally not be shared with the content server (and/or any third-party applications) may include, but are not limited to, private user information such as the name, age, sex, race, height, weight, address, telephone number, etc., of the user and/or private usage information such as whether an application has been deleted, used, shared, reviewed, etc., as well as when and/or for how long certain applications (and/or device functions) of the device have been utilized by the user. In some examples, the information that is provided to the server with the electronic content request is limited to information that identifies that the user has downloaded and/or purchased a particular application.

Additionally, the electronic content server, having received a request for content, may be configured to determine appropriate content to provide back to the user device. In examples where the electronic content is an advertisement, appropriate content may be content that is deemed to be relevant to a user's purchasing/ordering habits. For example, the content may be a targeted advertisement, which may be particularly targeted towards the user based at least in part on what the user has purchased in the past, what applications the user accesses regularly (e.g., on the user device), what items or services the user may likely order or purchase in the future, etc. In some examples, as noted, the content server may receive the request for content with only a limited (subset) of the user and/or usage information that is stored on the user device. As such, the content server may not be able to determine the most appropriate content to provide to the user device. Instead, the content server may generate a set of content items (advertisements) that may all be somewhat relevant, and provide the set to the user device. The user device may then determine which content item of the content items to present to the user.

In some cases, the set of content items may include some number (three, four, five, etc.) of content items that are each slightly different. For example, each content item may represent a different version of a similar advertisement, where each one would be more or less appropriate given particular user and/or usage information. As noted, the request for content may not include the private or sensitive usage information, so the content server may not be best suited to make the decision regarding which version of the advertisement to provide. Instead, the set (package) of content items may be sent to the user device with computer-executable logic that, when executed by the user device, can be used to determine which of the set of content items would be most appropriate. Because the user device manages (stores) the private/sensitive information, the user device may be better suited to make the determination. As such, the user device may execute the logic, and utilize the locally stored user/usage information to determine which content item to present to the user. In some examples, the logic that is included with the package of content items may be made up of two or more if-then-else statements. When evaluated with respect to the locally stored user/usage information, the logic can instruct the user device regarding which content item to present to the user. In some embodiments, if-then or if-then-else statements may be nested. For example, a single (initial) if-then portion of a statement may include additional if-then or if-then-else statements to be evaluated just to determine the outcome of the initial if-then statement.

In one example, a user may have downloaded a strategy game onto a user device. Additionally, an application of the user device may wish to present an advertisement related to games. However, a set of rules of the user device might not allow the user device to provide any personal information to the server. In this example, the user device may request an advertisement from the server, and the request to the server may only include information that identifies that the strategy game had been downloaded. The information may not include when the game was downloaded, how often the user has ever played it, whether the user has deleted the game, and/or whether the user plays math games more often than strategy games. As such, the server may generate a package of advertisements and the provide the package with some logic that can enable the user device to determine which advertisement of the package to present. The user device may receive the package and execute the instructions. In some examples, the package of advertisements may include advertisements to download a math game, to re-download the strategy game, to make a purchase related to the strategy game. When executing the logic, the user device may step through a series of if-then-else statements such, analyzing each statement with respect to locally stored user/usage information that was not allowed to be shared with the server. As such, the user device may determine that the user plays math games more than strategy games, and based at least in part on this decision, may present the advertisements to download the math game. Alternatively, the user device may determine that the user plays the strategy game often, and based at least in part on this decision, may present the advertisement to make a purchase (e.g., an in-app purchase) related to the strategy game.

While examples given in this disclosure describe features for providing advertisements to user devices, the subject matter and features are also relevant to and can be utilized for providing any type of electronic content to a user device in a customized manner. However, as noted, the customized content may be requested without all of the relevant information being provided. In some examples, these features improve the way a user device and/or the server performs by enabling the devices to limit the need to transmit and/or receive large amounts of information. Additionally, performance of the server computer is improved, in particular, by reducing the amount of processing bandwidth or speed needed to determine which content item to provide. Other improvements to the system and/or the computing devices that implement the system include ensuring that private user data is not exported from the user device or otherwise shared with any other parties.

FIG. 1 illustrates an example environment 100 for describing features of the electronic content requests described herein. In the example environment 100, a user device 102 collects device usage information 104 associated with usage of applications, etc., of the user device 102 by a user of the user device 102. In some examples, the device usage information 104 may be made up of general usage information 106 as well as user-specific information 108(A) and/or 108(B) (collectively, "user-specific information 108"). As noted, the general information 106 may include information that does not describe the user or any user-specific information. Alternatively, the user-specific information 108 may describe the user or specific usage information that could be considered private or user-specific (e.g., how often the user accesses certain applications or data, what applications the data has deleted, shared, reviewed, etc., what items or services the user has viewed, ordered, or purchased using the user device, etc.). The user-specific information 108 may also include private and/or sensitive information, while general information 106 may include the non-private and/or non-sensitive information described above. In some examples, a data storage device 110 of the user device 102 may be partitioned into a first storage location 112 and/or a second storage location 114. The first storage location 112 may be configured for storing the general information 106 while the second storage location 114 may be configured for storing the user-specific information 108. In some instances, the first storage location 112 and the second storage location 114 may be located in the same physical area of a storage system or subsystem. When this is the case, the user device 102 may be configured to manage the storage of the general information 106 and the user-specific information 108 such that they are associated with respective tags, keys, or identifiers (e.g., in a database table or the like) that indicate the type of information they represent (general or user-specific). In other words, the first storage location 112 and the second storage location 114 may be part of the same storage device or memory partition.

In some examples, the user-specific information 108 may be stored in the second location 114 and/or managed by a service or module of the user device 102. The service may be configured to allocate space within the second storage location 114 and/or encrypt the user-specific information 108 to protect it from being accessed (e.g., even if accessed, the data would be able to read without being decrypted). The service may also require that a software application (e.g., of the user device 102) request the user-specific information 108 from the service. In other words, software applications and/or the user of the user device 102 may not have direct access to the user-specific information 108 and/or the second storage location 114 without making a request to the service for the data. Additionally, the service may enable the user device 102 and/or first-party applications of the user device 102 to request the user-specific information 108 via one or more Application Programming Interface (API) methods. For example, the service may provide one or more API method calls that the user device 102 and/or a software application of the user device 102 may place in order to access the user-specific information 108.

In some examples, the user device may 102 may be configured to communicate with a content server 116 using one or more networks 118. As noted, the content server 116 can be a web server, an advertisement server, or the like. Based at least in part on requests from a user or from an application, the user device 102 may make requests 119 for content from the content server 116. Generally, requests 119 for content may include some information about the user or the user device 102 such that the content server 116 is able to determine what content to transmit back to the user device 102 in response to the request 119. This information might identify the user and/or identify usage information 104 associated with the user's use of the user device 102. However, in order to improve the functionality of the user device 102 and/or the content sever 116, the user device 102 may be configured to only provide a subset (e.g., not all) of the usage information 104 that it has been collected. For example, the request 119 for content may only include general information 106 (e.g., data stored in the first storage location 112). This general information 106 may provide very limited information about the user, the user device 102, and/or usage of the user device 102.

Prior to sending the request 119 with the general information 106 (e.g., in the first storage location 112), the user device 102 may determine which information to send in the request 119. For example, the user device 102 may analyze a set of rules or other criteria for determining what information can be shared. In some cases, the rules may be based at least in part on privacy concerns. However, in other cases, the rules may be based at least in part on bandwidth concerns and/or processing power concerns. For example, the networks 118 may not be configured to handle transmitting all of the usage information 104. Thus, the user device 102 may need to first determine the appropriate subset of information that will be considered general information 106. As such, data may be moved from one storage location to another and/or associated with different tags, thereby re-categorizing data so that it can be provided with the request 119 when appropriate.

In some examples, the content server 116 may receive the request 119 with the general information 106 and determine a package 120 of electronic content items 122 to send back to the user device 102 in response to the request 119. The package may also contain logic 124 for instructing the user device 102 which of the electronic content items 122 to present to the user. In one example, the electronic content items 122 may include a first content item 126, a second content item 128, and a third content item 130. In this example, the logic 124 may include instructions (e.g., an if-then-else statement) to be evaluated that can instruct the user device 102 regarding whether to present the first content item 126, the second content item 128, or the third content item 130. In this way, the logic 124 can be executed by the user device 102, where the user-specific information 108 can be analyzed without being transmitted outside of the user device 102. In other words, the user device 102 can evaluate the if-then-else statement in light of the user-specific information 108 without transmitting the user-specific information 108. In some examples, the evaluation may be performed at least using the API method calls described above (e.g., an API call to the service described above enables access to the user-specific information 108 for use in the evaluation. Additionally, while the content server 116 may narrow down the list of potential content items to provide to the user device 102, the user device 102 will make the final determination of which electronic content item 122 to present to the user. And, this determination can be made using the user-specific information 108 that is not to be shared outside of the user device 102 or outside of first-party applications of the user device 102.

In some examples, the networks 118 may include any one or a combination of many different types of networks, such as cable networks, the Internet, wireless networks, cellular networks, satellite networks, other private and/or public networks, or any combination thereof. While the illustrated example represents the user device 102 accessing the content server 116 via the networks 118, the described techniques may equally apply in instances where the user device 102 interacts with the content server 116 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer configurations, etc.).

Figure 2:
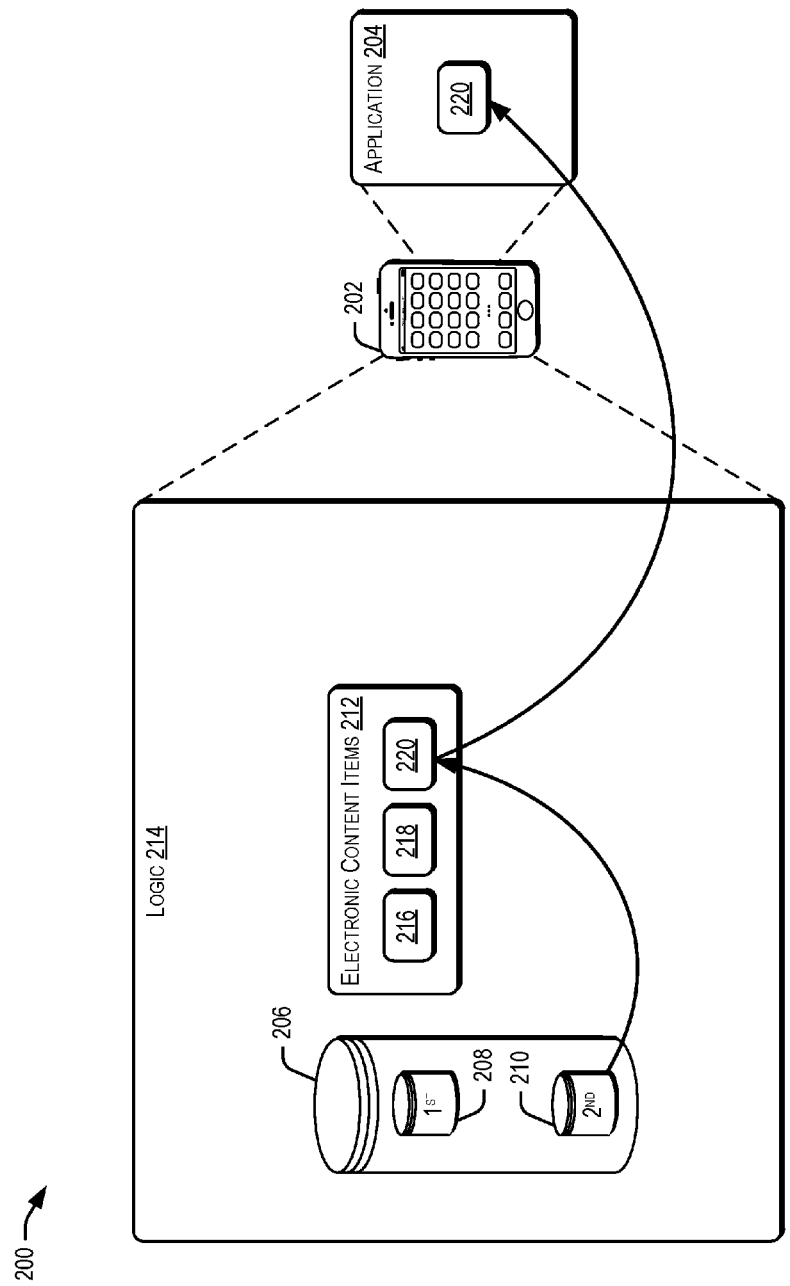
FIG. 2 is another simplified block diagram illustrating at least some additional example techniques for managing electronic content requests as described herein, according to at least one example.

FIG. 2 illustrates an example environment 200 for describing additional features of the electronic content requests described herein. In the example environment 200, a user device 202 (much like the user device 102 of FIG. 1) collects device usage information associated with usage of applications (e.g., application 204), etc., of the user device 202. The application 204 may be any type of first-party (native) or third-party software application running on the user device 202. For example, a first-party applications may be pre-installed on the user device 202 and/or provided, managed, or otherwise controlled by an entity responsible for the operating system or manufacturing of the user device 202. In some examples, first-party applications are considered secure applications and/or may be provided with user-specific and/or usage information associated with the user device 202. Third-party software applications, on the other hand, are generally designed, encoded, and provided by third-parties that are different from the entity that provides the operating system and/or the user device 202 itself. As such, third-party software applications are generally not privy to any user and/or usage information.

Similar to the user device 102 of FIG. 1, the user device 202 of FIG. 2 may be configured with a data storage device 206 that can store a first set of information 208 and a second set of information 210 about usage of the user device 202. Much like the device usage information 104 of FIG. 1, the first set of information 208 may correspond to general usage information and the second set of information 210 may correspond to user-specific usage information. User-specific information can include identification of events and/or actions performed by a user with one or more applications of the user device 202. For example, if the user opens an application, and performs an action, the opening and the action can be recorded in the second set of information 210. Additionally, the second set of information 210 can also include timestamp information that indicates when the action occurred and/or for how long the action was performed. The timestamp information may be stored as metadata.

As described with respect to FIG. 1, an application (e.g., the application 204) or service of the user device 202 may request electronic content from a server or other computing device that can provide electronic content. That request may include information from the first set of information 208 but not from the second set of information 210. At least in response to this request, the user device 202 may receive a package of electronic content items 212 and some computer-executable logic 214. The package of electronic content items 212 may also include one or more different content items 216, 218, 220. In some examples, upon executing (evaluating) the logic 214, the user device 202 may determine that the application 204 should present one of the content items 220 of the package of electronic content items 212. For the example, the logic 214 may indicate that if some rule evaluates to true, that the content item 220 is to be presented by the application 204. The user device 202 may then present the content item 220 over the application 204 and/or as part of a user interface (UI) of the application 204, or it may provide the content item 220 to the application 204.

In one example, the first set of information 208 that is provided to the server with the request for content may identify that a user has downloaded a particular game or software application to the user device 202. However, this may be all that is provided with the request. The application 204 (which may be a first-party or a third-party application) may have placed the request for the electronic content and may or may not be related at all to the game that was downloaded by the user. However, the server may not be able to provide relevant content in response to the request, because the server is unaware of the second set of information 210 that indicates usage information associated with the user device 202. For example, the second set of information 201 may indicate whether the game has been deleted from the user device 202, whether it is played often, rarely, or never. Thus, the server may provide the package of electronic content items 212 that includes a first content item 216 that recommends that the user re-download the game, a second content item 218 that recommends that the user open and/or play the game, and a third content item 220 that recommends that the user perform an action within the game (e.g., purchase new levels, etc.).

In this use case, the logic 214 provided with the package of electronic content items 212 may include a set of if-then-else statements that can be evaluated using the second set of information 210. The if-then-else statements may state: if the game has been deleted from the user device 202, provide the first content item 216; else, if the game still exists on the user device 202 but hasn't been opened in a while (e.g., a threshold number of hours, days, etc.), provide the second content item 218; else, if the game still exists on the user device 202 but is opened regularly (e.g., based at least in part on the same or other threshold number of hours, days, etc.), provide the third content item 220. As should be understood, in the if-then-else statement, the "if the game still exists" part of the evaluation may not be necessary. Additionally, for each evaluation, the second set of information 210 may be referenced in order to determine the outcome (e.g., the second set of information 210 can indicate whether the game was deleted and/or how often the user accesses the game). In some examples, the content items 216, 218, 220 may be presented as banners, in a feed, somewhere within the UI of the application 204, and/or with a native look and feel.

Figure 3:
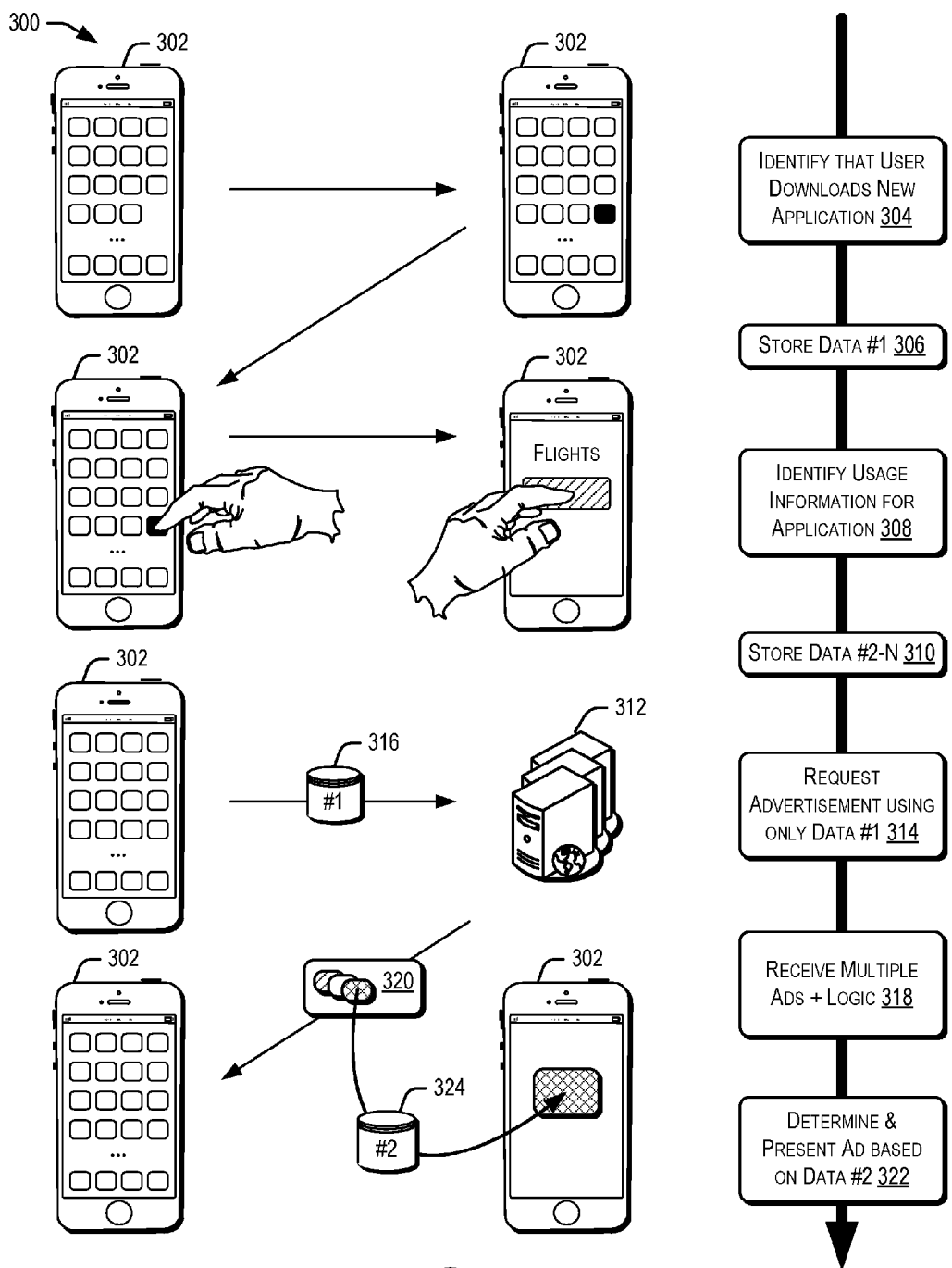
FIG. 3 is a simplified flow diagram illustrating at least some example techniques for managing electronic content requests as described herein, according to at least one example.

FIG. 3 illustrates a simplified flow diagram 300 depicting an example of the electronic content requests described herein. In some examples, a user device 302 may be configured with one or more software applications. In FIG. 3, these software applications are represented by the various white squares presented on the user interface of the user device 302. In some instances, a user of the user device 302 may download and/or install a new software application, indicated by the black square on the user device 302. At 304, the user device 302 may identify that the user has downloaded the new software application. At 306, the user device 302 may be configured to store first data that identifies that the user downloaded the new software application. In some instances, this may not be considered usage, user-specific, or sensitive information as it doesn't identify any specific actions of the user or the user device 302 other than that the software application was downloaded. The new application can be any type of software application. For example, it can be a weather application, a stop-watch application, an email client application, a travel application, a gaming application, etc.

In some cases, the user may interact with the new application. For example, the user may open the application, select features of the application, order a service or an item through the application, read news articles, review travel plans, or play a game. At 308, the user device 302 may be configured to identify usage information associated with the user's use of the new application (or any application of the device 302). For example, the user device 302 may identify the time of the interaction, the length of the interaction, the type of the interaction (e.g., did the user order an item, or just review the price of an item, etc.). At 310, the user may store additional data that identifies the usage information that was identified. This usage data may be stored in a separate storage location or may just be tagged or otherwise identified (e.g., with metadata) as usage information that is not to be shared or otherwise transmitted to other devices and/or third-party applications.

At some point (e.g., at least in response to a request from an application of the user device 302), the user device 302 may request electronic content (e.g., an advertisement or notification) from a server computer 312. The request may occur at 314, and may be made using only the first data 316 identified and stored at 304, 306. For example, only the information that identifies that the new application identified at 304 has been downloaded may be provided to the server computer 312. Additionally, in some examples, the request made to the server computer 302 may also include additional information that identifies how much usage information the user device 302 has acquired about the new application. For example, without transmitting the actual usage information, the additional data may identify a cardinality or other metric that is indicative of the amount of usage information that has been collected about the new application or any application of the user device 302.

In some examples, at 318, the user device 302 may receive a package 320 that includes multiple electronic content items (e.g., advertisements) from the server computer 312. Each of the multiple electronic items may be different (e.g., different versions of the same advertisement, different advertisements, different versions of a song, different pictures, etc.), and the package 320 may also include some logic for enabling the user device 302 to determine which of the multiple electronic content items are most appropriate and/or which of the multiple electronic content items to present to the user (e.g., on a display of the user device 302). In some examples, the number of the electronic content items provided it he package 320 may be based at least in part on the amount of usage information that was identified and/or provided by the user device 302 at 314. For example, if the amount of usage information that was collected by the user device 302 was very little (e.g., zero to ten data points), the package 320 may only include one or two content items. However, if the amount of usage information is large, the number of content items included in the package 320 may be larger (e.g., three or more). As such, the number of content items (and/or the complexity of the logic) provided in the package 320 may be directly proportional to the amount of usage information collected by the user device 302.

In some examples, at 322, the user device 302 may determine and/or present an appropriate (best) content item (e.g., advertisement) of the multiple electronic content items received in the package 320. The determination may be based at least in part on evaluating the logic that was received at 318 with respect to the second type of information 324 (e.g., the usage information) identified at 308 and stored at 310. For example, the logic may be a set of rules or if-then (or if-then-else) statements, and the second type of information 324 may include the values (e.g., parameters) that are used to evaluate the rules or if-then statements. In one non-limiting example, the second type of information 324 might indicate that the user has accessed an application every day for the week. Thus, if one of the rules or if-then statements is evaluating whether the application has been accessed more than twice in the last week, the second type of information 324 would be referenced, and the rule would be evaluated to true. If so, the content item associated with that rule would be presented (e.g., on the display of the user device 302).

Figure 4:
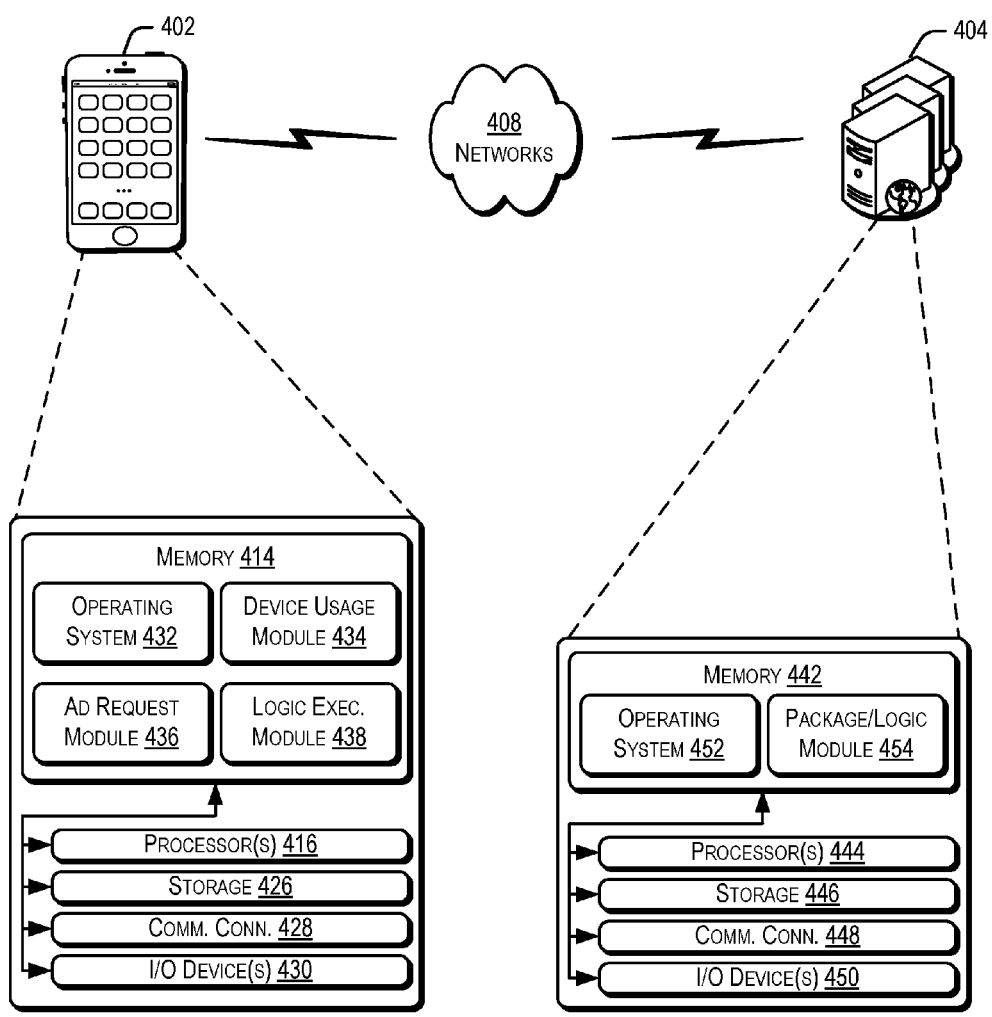
FIG. 4 is a simplified architecture diagram illustrating at least some example techniques for managing electronic content requests as described herein, according to at least one example.

FIG. 4 illustrates an example architecture or environment 400 illustrating examples of electronic content requests made by a user device 402 (e.g., a mobile phone) for content to be provided by a content server 404 (e.g., an advertisement server), according to at least one example. In some examples, one or more users may utilize the user device 402 to make telephone calls, access the Internet, read messages (e.g., Short Messaging Service (SMS) messages, emails, or the like). Additionally, users may use the user device 402 to download, install, delete, and/or utilize software applications that can be executed by the user device 402. The user device 402 may also be configured to perform any of the functions, features, or use cases described above, including with respect to FIGS. 1-3.

In some examples, the networks 408 may include any one or a combination of many different types of networks, such as cable networks, the Internet, wireless networks, cellular networks, satellite networks, other private and/or public networks, or any combination thereof. While the illustrated example represents the user device 402 accessing the server computer 404 via the networks 408, the described techniques may equally apply in instances where the user device 402 interacts with the server computer 404 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.). For example, the functionality of the user device 402 and the server computer 404 may be performed on a single device, where a first application provides a request for content from a second application (e.g., providing only limited information with the request), and the second application replies back with a package of content items and instructions for determining which of the content items is best (e.g., most appropriate) based at least in part on second information (e.g., more than the limited information that was provided) accessible only to the first application.

As noted above, the user device 402 may collect usage information (e.g., associated with a particular user or a group of users) that is private or at least not shareable based at least in part on one or more rules. The rules may be generated by a service provider (e.g., entity that provided the operating system, the device, or an application implementing the rules) and/or a software developer. The rules may also be configurable by a user of the device 402. In some examples, the user device 402 may request content from the server computer 404, but may only provide a limited set of information to the server computer 404. For example, the user device 402 may have collected usage information about the user's activities performed on the user device 402; however, the user device 402 may only provide some (or none) of the usage information. The server computer 404 may then provide a package of content items and some logic for the user device 402 to execute. Execution of the logic may enable the user device 402 to determine which content item of the package to present to the user. Additionally, in some examples, the content item to be presented may be a dynamic content item (e.g., it may be configured as a template content item with missing information in particular locations of the content item). The dynamic content items may then be updated with relevant information based at least in part on the usage information that was not shared with the server computer 404.

The user device 402 and/or the server computer 404 may be any type of computing device such as, but not limited to, a mobile phone, a smartphone, a personal digital assistant (PDA), a laptop computer, a desktop computer, a thin-client device, a tablet computer, a smart watch, a wireless headset, or the like. As noted, the user device 402 may be in communication with the server computers 404 via the networks 408, or via other network connections.

In one illustrative configuration, the user device 402 may include at least one memory 414 and one or more processing units (or processor(s)) 416. The processor(s) 416 may be implemented as appropriate in hardware, computer-executable instructions, firmware, or combinations thereof. Computer-executable instruction or firmware implementations of the processor(s) 416 may include computer-executable or machine-executable instructions written in any suitable programming language to perform the various functions described. The user device 402 may also include accelerometer devices and/or motion detection device for detecting a user's activity or motion while wearing the user device 402 or while the user is within view of the user device 402. The user device 402 may also include geo-location devices (e.g., a global positioning system (GPS) device or the like) for detecting, providing, and/or recording geographic location information associated with the user device 402 and/or the user.

The memory 414 may store program instructions that are loadable and executable on the processor(s) 416, as well as data generated during the execution of these programs. Depending on the configuration and type of the user device 402, the memory 414 may be volatile (such as random access memory (RAM)) and/or non-volatile (such as read-only memory (ROM), flash memory, etc.). The user device 402 may also include additional removable storage and/or non-removable storage 426 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 414 and the additional storage 426, both removable and non-removable, are all examples of non-transitory computer-readable storage media. For example, non-transitory computer readable storage media include volatile or non-volatile, removable or non-removable media implemented in any method or technology (other than carrier waves or other transient media) for storage of information such as computer-readable instructions, data structures, program modules, or other data. The memory 414 and the additional storage 426 are both examples of non-transitory computer storage media. Additional types of computer storage media that may be present in the user device 402 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 402. Combinations of any of the above should also be included within the scope of non-transitory computer-readable storage media.

Alternatively, computer-readable communication media includes computer-readable instructions, program modules, or other data transmitted within a data signal, such as a carrier wave, or other transmission. However, as used herein, computer-readable storage media does not include computer-readable communication media.

The user device 402 may also contain communications connection(s) 428 that allow the user device 402 to communicate with a data store, another computing device or server (e.g., the server computer 404), user terminals and/or other devices via the networks 408. The user device 402 may also include I/O device(s) 430, such as a keyboard, a mouse, a pen, a voice input device, a touch input device, a display, speakers, a printer, etc. For example, utilizing a speaker and microphone, the user device 402 may be configured to answer incoming calls.

Turning to the contents of the memory 414 in more detail, the memory 414 may include an operating system 432 and/or one or more application programs or services for implementing the features disclosed herein including a device usage module 434, an advertisement request module 436, and/or a logic execution module 438. In some examples, the device usage module 434 may be configured to detect user actions with the user device, including events, clicks, etc., associated with a software application or service of the user device 402. For example, and as discussed above, one or more sensors of the user device 402 may be able to detect user actions with respect to the user device 402. In this way, the device usage module 434 is able to record and manage information that identifies activities, actions, habits, and/or preferences of the user. For example, the device usage module 434 may be configured to detect and/or store information about when and/or how often a user uses a particular application, what items/services and/or types of items/services the user typically searches for, orders, and/or purchases, etc.

The advertisement request module 436, in some cases, may be configured to identify when an advertisement or other content should be presented to a user. In some examples, the determination may be based at least in part on a particular request for the content (e.g., from the user, from an application of the user device 402, etc.). However, in other examples, the determination may be based at least in part on a timer, schedule, or other programmatic setting or preference. For example, the advertisement request module 436 may be configured to request electronic content at certain time intervals (e.g., hourly, daily, etc.) and/or in response to particular actions that are performed by the user (e.g., searching for a particular item in a web browser, arriving at or leaving a particular location, etc.). The advertisement request module 436 may also request any type of electronic content (e.g., not just advertisements) and may be configured to request content from any software application or service, independent of the source (e.g., from the server computer 404, from a third-party application of the user device 402, and/or another first-party application of the user device 402.

The logic execution module 438 may be configured to receive and execute logic that accompanies or part of a package of electronic content. For example, the package of electronic content items (e.g., advertisements) may be received at least in response to a request. The logic may include rules, predicates, if-then statements, and/or if-then-else statements. The logic execution module 438 may then be configured to execute the logic and evaluate the rules, predicates, and/or statements utilizing device usage information (e.g., collected by the device usage module 434). Once the rules are evaluated, the logic execution module 438 may also be configured to determine an appropriate content item of the package of electronic content items to be presented to the user. For example, the evaluation of the rules may provide the appropriate content item, and logic execution module 438 may then present the appropriate content item to the user.

Additionally, in some examples, the logic execution module 438 may also be configured to determine when a content item is a template or otherwise is missing data. When this is determined, the logic execution module 438 may be able to identify the appropriate information to include in the place of the missing data. For example, if a content item is an advertisement for a flight, but the departure location, destination location, and/or flight dates are missing from the advertisement, the logic execution module 438 may be configured to identify appropriate information to insert into the advertisement (e.g., departure, destination, dates, etc.). This information may be collected or otherwise identified from within the data collected by the device usage module 434. Additionally, once this information is collected, a request to an appropriate service or server may be made to finish the advertisement with information that corresponds to the customized information that was inserted into the template. For example, given the newly determined destination, departure, and/or date information, a service may be able to provide an estimated price. The logic execution module 438 may then be able to present the advertisement with all the relevant information (e.g., the destination location, the departure location, the flight date, and the corresponding estimated price information). In some cases, the departure location may be the actual location of the user device 402 (e.g., based at least in part on the geolocation of the user device—which may be part of the usage information). Additionally, the destination location may be selected from a calendar appointment of the user device 402 (or user) and/or a location from a search history of the user device 402 (both of which may be part of the usage information). Further, in some examples, the user device 402 may download a table of data (e.g., flight pricing data) such that it can identify an appropriate amount to enter into one of the fields, once the fields are filled in, without having to request the data from the service provider each time. The table may be stored locally and/or stored on a first-party server different from the service provider that provided the data (e.g., one of the server computers 404).

The server computers 404 may also be any type of computing devices. In one illustrative configuration, the server computers 404 may include at least one memory 442 and one or more processing units (or processor(s)) 444. The processor(s) 444 may be implemented as appropriate in hardware, computer-executable instructions, firmware, or combinations thereof. Computer-executable instruction or firmware implementations of the processor(s) 444 may include computer-executable or machine-executable instructions written in any suitable programming language to perform the various functions described.

The memory 442 may store program instructions that are loadable and executable on the processor(s) 444, as well as data generated during the execution of these programs. Depending on the configuration and type of the server computers 404, the memory 442 may be volatile (such as RAM) and/or non-volatile (such as ROM, flash memory, etc.). The server computers 404 may also include additional removable storage and/or non-removable storage 446 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 442 may include multiple different types of memory, such as SRAM, DRAM, or ROM. While the volatile memory described herein may be referred to as RAM, any volatile memory that would not maintain data stored therein once unplugged from a host and/or power would be appropriate. The memory 442 and the additional storage 446, both removable and non-removable, are both additional examples of non-transitory computer-readable storage media.

The server computers 404 may also contain communications connection(s) 448 that allow the server computers 404 to communicate with a data store, another computing device or server, user terminals and/or other devices via the networks 408. The server computers 404 may also include I/O device(s) 450, such as a keyboard, a mouse, a pen, a voice input device, a touch input device, a display, speakers, a printer, etc.

Turning to the contents of the memory 442 in more detail, the memory 442 may include an operating system 452 and/or one or more application programs or services for implementing the features disclosed herein including a package/logic module 454. In some examples, the package/logic module 454 may be configured to determine a set of content items to provide to the user device 402 based at least in part on a request from the user device 402. As noted, the request may include very little information about the content item that should be provided. As such, the server computer 442 may need to determine a set of relevant content items to send such that the user device 402 can make the final determination based at least in part on some logic and/or a set of rules. The package/logic module 454 may, therefore, also be configured to provide the logic.

In some examples, the package/logic module 454 may already be configured with logic for determining which content item of the package to provide to the user device 302. However, the package/logic module 454 may not be capable of implementing the logic in the case where usage information of the user device 402 is not provided. Thus, the package/logic module 454 may prepare the package and logic in such a way that the logic execution module 438 can make the determination at the user device 402. In some cases, this process enables more security regarding the usage information collected by the device usage module 434. However, the functionality described herein also improves content request and/or client-server framework technology by limiting the amount of data that needs to be transmitted with each request for content. The package/logic module 454 may also configure the package of content items with information that instructs the logic execution module 438 regarding when to present the content. Additionally, each package and/or individual content item of a package may be configured with a timestamp and/or an expiration time. In this way, the logic execution module 438 can ensure that the content is still fresh and includes relevant (and still valid) data.

Figure 5:
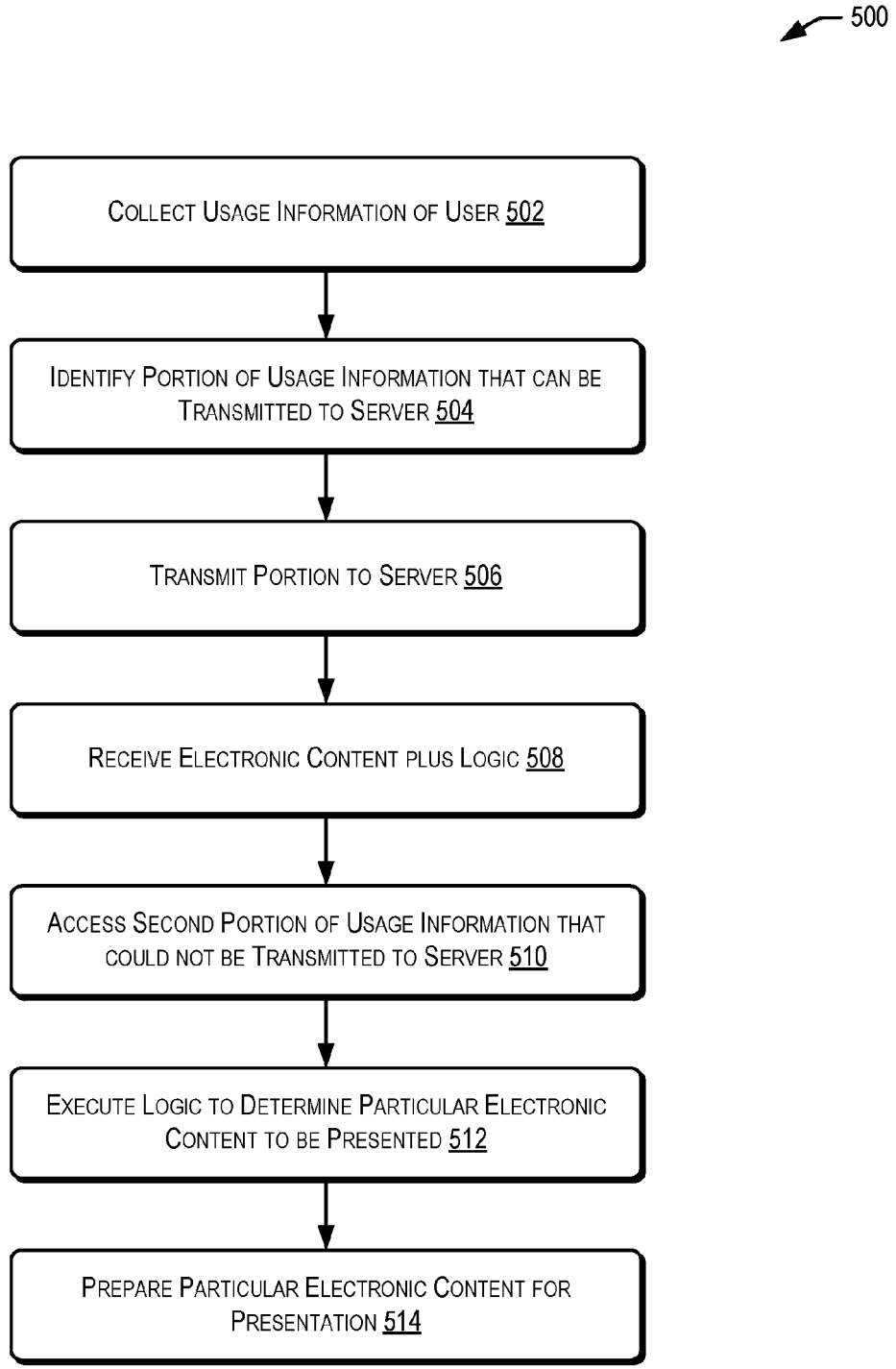
FIG. 5 is another simplified flow diagram illustrating an example process for managing electronic content requests as described herein, according to at least one example.
Figure 6:
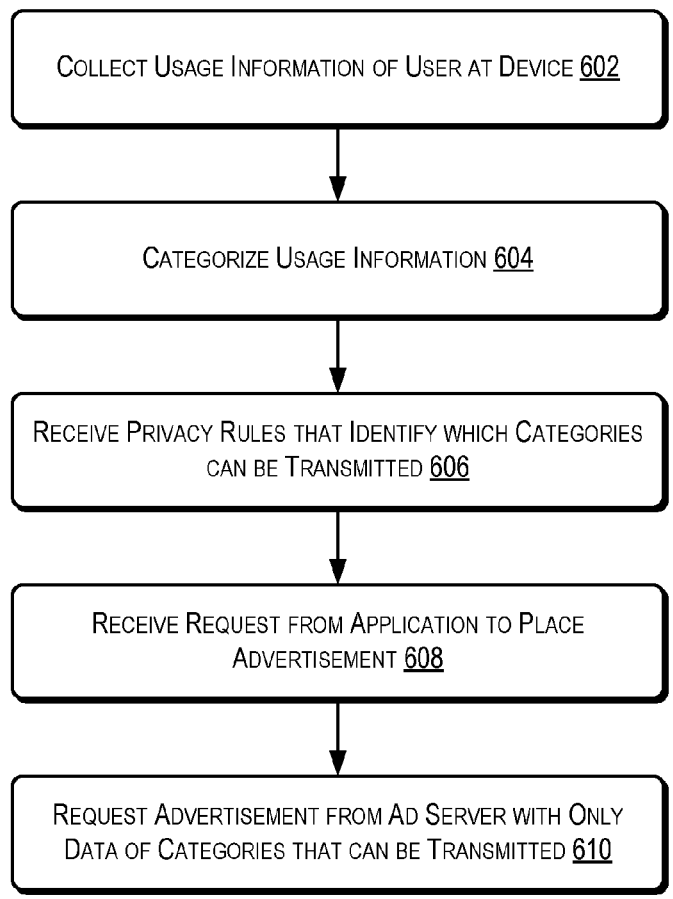
FIG. 6 is another simplified flow diagram illustrating another example process for managing electronic content requests as described herein, according to at least one example.
Figure 7:
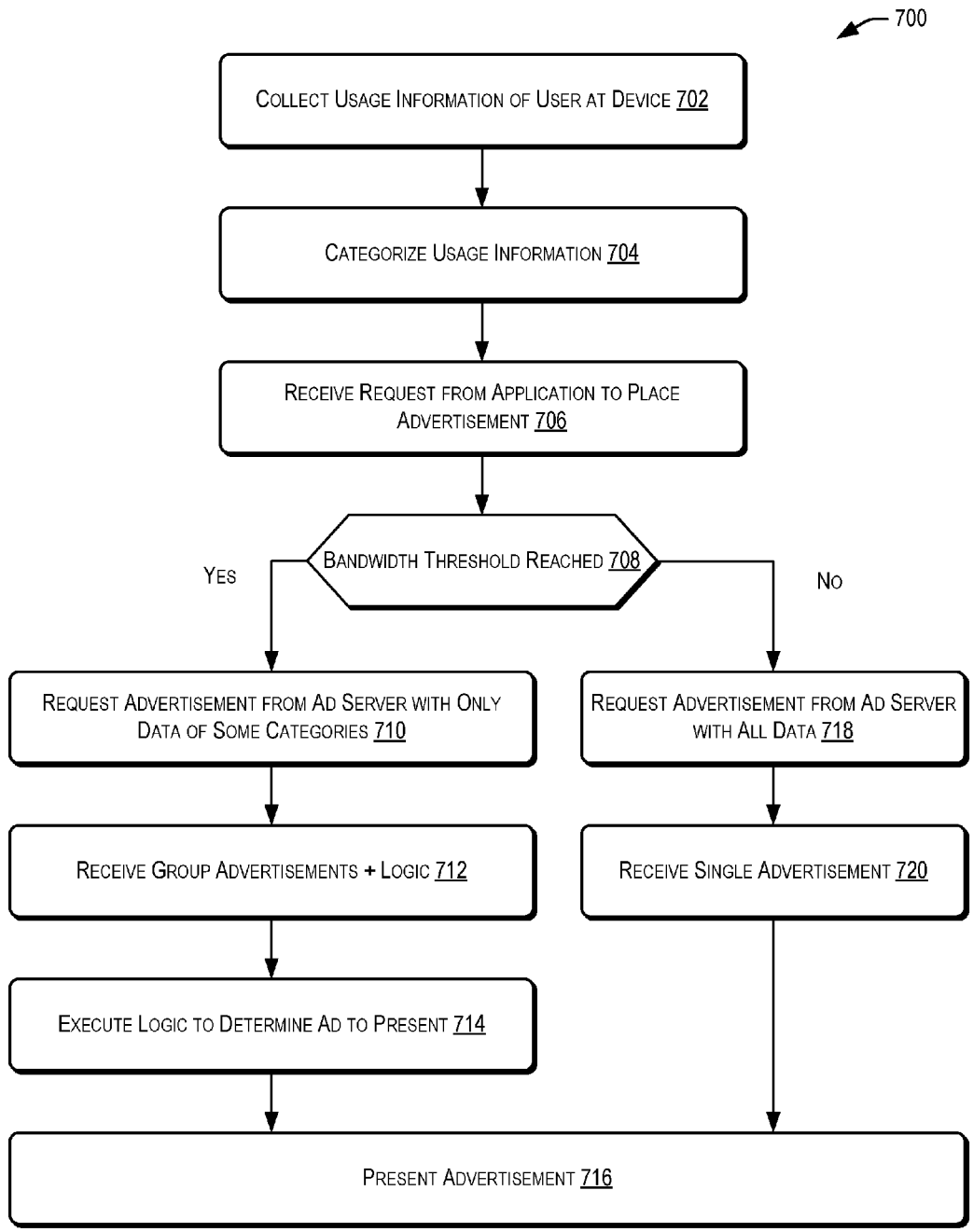
FIG. 7 is another simplified flow diagram illustrating another example process for managing electronic content requests as described herein, according to at least one example.

FIGS. 5-7 illustrate example flow diagrams showing processes 500, 600, and 700 for managing electronic content requests, according to at least a few embodiments. In some examples, the user device 402 of FIG. 4 (e.g., utilizing at least the device usage module 434 and/or the logic execution module 438) may perform the process 500 of FIG. 5. The process 500 may begin at 502 where a computing device may collect usage information of a user. In some examples, the usage information may indicate times when a user has accessed a software application of the user device. The usage information may also include which applications were accessed, how often each was accessed, how long each application was accessed, and/or what actions the user took with those applications. Other usage information may not even be related to software applications, but may include location information, travel speed, etc. At 504, a portion of the usage information that can be transmitted to a server may be determined. For example, some of the usage information may be prohibited from being sent to any other device and/or to any other application. However, in some cases, some usage information (e.g., which applications were downloaded by an account associated with the user) may be transmitted to the server or other computing device. The amount or type of shareable usage information might be determined based at least in part on privacy rules, opt-in/opt-out settings of a user, and/or user preference settings.

In some examples, at 506, the portion of usage information that was determined at 504 may be transmitted to the server. For example, a request for content may be sent to the server, and the request may include the limited amount of information (e.g., that a user has downloaded a particular software application). However, in some cases, no other information may be provided to the server at 506. At 508, a set (package, bundle, etc.) of content items plus some logic for determining which content item to provide may be received. In some examples, the additional usage information (e.g., the information that was collected but not shared with the server) may be accessed at 510. At 512, the logic may be executed to determine particular electronic content of the set of electronic content items to be presented. The logic may include if-then and/or if-then-else statements that can be evaluated using the usage information that was accessed at 510. Additionally, in some examples, the process 500 may end at 514, when the particular content item that was determined at 512 may be prepared for presentation and/or presented to the user.

FIG. 6 illustrates another process 600 for managing electronic content requests, according to at least a few embodiments. In some examples, the user device 402 of FIG. 4 (e.g., utilizing at least the device usage module 434 and/or the logic execution module 438) may perform the process 600 of FIG. 6. The process 600 may begin at 602 where a computing device may be configured to collect usage information of a user that is using the computing device. In some examples, the usage information may be categorized at 604. For example, the device may categorize data into user-specific data, private data, sensitive data, public data, or the like. At 606, privacy rules that identify which categories can be transmitted (shared) may be received. The privacy rules may indicate specific rules for which categories of data can be shared with which other devices or applications (if any). In some cases, at 608, a request to place an advertisement may be received from a third-party application. The third-party application may be executed on the same device that is requesting the advertisement, and the advertisement may be requested on behalf of the third-party application. Additionally, the third-party application may be managed or otherwise provided by a different entity that manages the user device that is collecting the usage information. As such, the rules may indicate that the third-party application and/or a content server may not be allowed to receive or access specific types of the categorized information. In some cases, the process 600 may end at 610 where a request is made for an advertisement. The request may be transmitted to an advertisement server and may include only the data that can be transmitted to the server (e.g., based at least in part on the determination made at 606).

FIG. 7 illustrates another process 700 for managing electronic content requests, according to at least a few embodiments. In some examples, the user device 402 of FIG. 4 (e.g., utilizing at least the device usage module 434 and/or the logic execution module 438) may perform the process 700 of FIG. 7. The process 700 may begin at 702 where a user device may collect usage information of a user. As described above, the usage information may be of different types (e.g., personal, private, public, etc.). At 704, the usage information may be categorized based at least in part on the different types of usage information. Additionally, in some examples, a request for electronic content may be received at 706. The request may be for an advertisement to be placed on the display of the user device (e.g., over a home screen or within a UI of an application).

In some examples, a bandwidth threshold may be determined or otherwise calculated. The bandwidth threshold may identify a local bandwidth of the user device (e.g., the amount of data that is accessible or able to be received by the user device). For example, if a user device is utilizing a Wi-Fi network within a location that is shared with other devices at the location, the local bandwidth threshold may indicate how much of the total Wi-Fi bandwidth is being shared with the other users. In this case, the bandwidth threshold may be higher (such that it is harder to reach) when there are less other devices sharing the network or the bandwidth threshold may be lower (such that it is easier to reach) when there are more other devices sharing the network. In other examples, the bandwidth threshold may identify a wide-area bandwidth that indicates the total congestion of the external network to which the user device is connected (e.g., a cellular network bandwidth or the like). At 708, it may be determined whether the bandwidth threshold has been reached. In some cases, the bandwidth threshold may be zero, such that the threshold is always reached.

If the bandwidth threshold is reached at 708, a request for content (e.g., an advertisement) may be placed with a server (e.g., an ad server) using only data of some of the categories at 710. For example, at 710, the request may be for an advertisement; however, the request may not include all of the usage information collected at 702. That is, because the bandwidth threshold is reached (e.g., there is limited bandwidth), not all of the usage data should be provided to improve the speed and functionality of the content request functionality described herein. At 712, a group (package) of advertisements may be received with some logic for determining which advertisement should be presented to the user. The logic may then be executed at 714 and the process 700 may end at 716, where the advertisement (or other content item) may be presented. However, in some examples, it may not be determined that the bandwidth threshold was reached at 708, in which case, at 718, the request for the content item (advertisement) may be made to the server, and the request may include all of the usage information collected at 702. In this case, a single advertisement may be received at 720, and the process 700 may end at 716, where the advertisement (or other content item) may be presented. When the bandwidth threshold is not reached at 708, the determination regarding which content item is most appropriate can be made by the server using all of the usage information that is provided by the user device.

Embodiments described herein may take the form of, be incorporated in, or operate with a suitable electronic device. Embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on. These and other functions, operations, and abilities of the electronic device will be apparent upon reading the specification in its entirety.

Illustrative methods and systems for managing electronic content requests are described above. Some or all of these systems and methods may, but need not, be implemented at least partially by devices and/or architectures such as those shown at least in FIGS. 1-7 above. While many of the embodiments are described above with reference to advertisements, it should be understood that any type of electronic content may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of computers, such as desktop or laptop computers running an operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method implemented on a client device, comprising:
    collecting usage information corresponding to use of the client device by a user, the usage information comprising a first category of the usage information and a second category of the usage information;
    identifying that first usage information of the first category of the usage information can be transmitted to other computing devices over a wireless computing network based at least in part on the first category of usage information comprising non-private information;
    transmitting, utilizing the wireless computing network, a request comprising the first usage information to an advertisement server computer;
    receiving from the advertisement server computer, utilizing the wireless computing network, content data that comprises a plurality of electronic content items configured to be displayed on a screen of the client device and a set of instructions for determining which of the plurality of electronic content items to display;
    accessing second usage information corresponding to the second category of the usage information, the second category of the usage information comprising private information;
    executing the set of instructions by evaluating the second usage information with respect to the plurality of electronic content items to determine a particular electronic content item of the plurality of electronic content items to display; and
    presenting the particular electronic content item for display on the screen of the client device.

2. The computer-implemented method of claim 1, wherein the set of instructions comprises if-then-else instructions configured to be evaluated utilizing the second usage information.

3. The computer-implemented method of claim 2, wherein executing the set of instructions comprises evaluating one if-then-else clause of the if-then-else instructions for each electronic content item of the plurality of electronic content items.

4. The computer-implemented method of claim 1, wherein at least one of the plurality of electronic content items is configured to be customized based at least in part on the second usage information.

5. The computer-implemented method of claim 1, wherein the second category of the usage information comprises user information corresponding to the user.

6. A user device, comprising:
    a memory configured to store computer-executable instructions;
    a display device; and
    a processor configured to access the memory and the display device, and to execute the computer-executable instructions to at least:
        collect usage information corresponding to use of the user device by a user, the usage information comprising a first category of the usage information and a second category of the usage information;
        identify that first usage information of the first category of the usage information can be transmitted to other computing devices over a wireless computing network based at least in part on the first category of usage information comprising non-private information;
        transmit a request comprising the first usage information to an advertisement server computer;
        receive, from the advertisement server computer, content data that comprises a plurality of electronic content items configured to be displayed on the display device and a set of instructions for determining which of the plurality of electronic content items to display;
        access second usage information corresponding to the second category of the usage information, the second category of the usage information comprising private information;
        execute the set of instructions by evaluating the second usage information with respect to the plurality of electronic content items to determine a particular electronic content item of the plurality of electronic content items to display; and
        present the particular electronic content item for display on the display device.

7. The system of claim 6, wherein the set of instructions comprise if-then logic for evaluating at least one if-then clause of the if-then logic for each electronic content item of the plurality of electronic content items.

8. The system of claim 6, wherein the set of instructions is generated by the advertisement server computer based at least in part on the first usage information of the first category.

9. The system of claim 8, wherein the first usage information of the first category comprises usage information that is identified as shareable with the advertisement server computer.

10. The system of claim 8, wherein the second usage information of the second category comprises usage information that is identified as exclusive to the memory of the user device.

11. The system of claim 6, wherein at least one electronic content item of the plurality of electronic content items is configurable based at least in part on the second usage information of the second category.

12. The system of claim 11, wherein a portion of the at least one electronic content item that is configurable is determined to be configurable by a service provider configured to provide the at least one electronic content item to the advertisement server computer.

13. The system of claim 11, wherein the portion of the at least one electronic content item is revised with additional data received from a service provider based at least in part on a request from the user device.

14. The system of claim 6, wherein the second usage information of the second category is accessible via an application programming interface method call made to a local data storage service of the user device.

15. The system of claim 6, wherein at least one electronic content item of the plurality of electronic content items comprises an expiration date.

16. A non-transitory computer-readable storage medium having stored thereon computer-executable instructions that, when executed by a processor of a user device, cause the processor to perform operations comprising:

collecting usage information corresponding to use of the user device by a user, the usage information comprising a first category of the usage information and a second category of the usage information;

identifying that first usage information of the first category of the usage information can be transmitted to other computing devices over a wireless computing network based at least in part on the first category of usage information comprising non-private information;

transmitting a request comprising the first usage information to an advertisement server computer;

receiving from the advertisement server computer, content data that comprises a plurality of electronic content items configured to be displayed on a screen of the user device and a set of instructions for determining which of the plurality of electronic content items to display;

accessing second usage information corresponding to the second category of the usage information, the second category of the usage information comprising private information;

executing the set of instructions by evaluating the second usage information with respect to the plurality of electronic content items to determine a particular electronic content item of the plurality of electronic content items to display; and presenting the particular electronic content item for display on the screen of the user device.

17. The non-transitory computer-readable storage medium of claim 16, wherein the set of instructions, when executed, configures the user device to determine the particular electronic content item of the plurality of content items to display based at least in part on a level of usage of an application of the user device.

18. The non-transitory computer-readable storage medium of claim 16, wherein the second usage information is only accessible by first-party applications of the user device.

* * * * *